Dec. 7, 1926.
M. V. LIDDELL
1,609,878
DISK WHEEL
Original Filed April 22, 1920    3 Sheets-Sheet 2
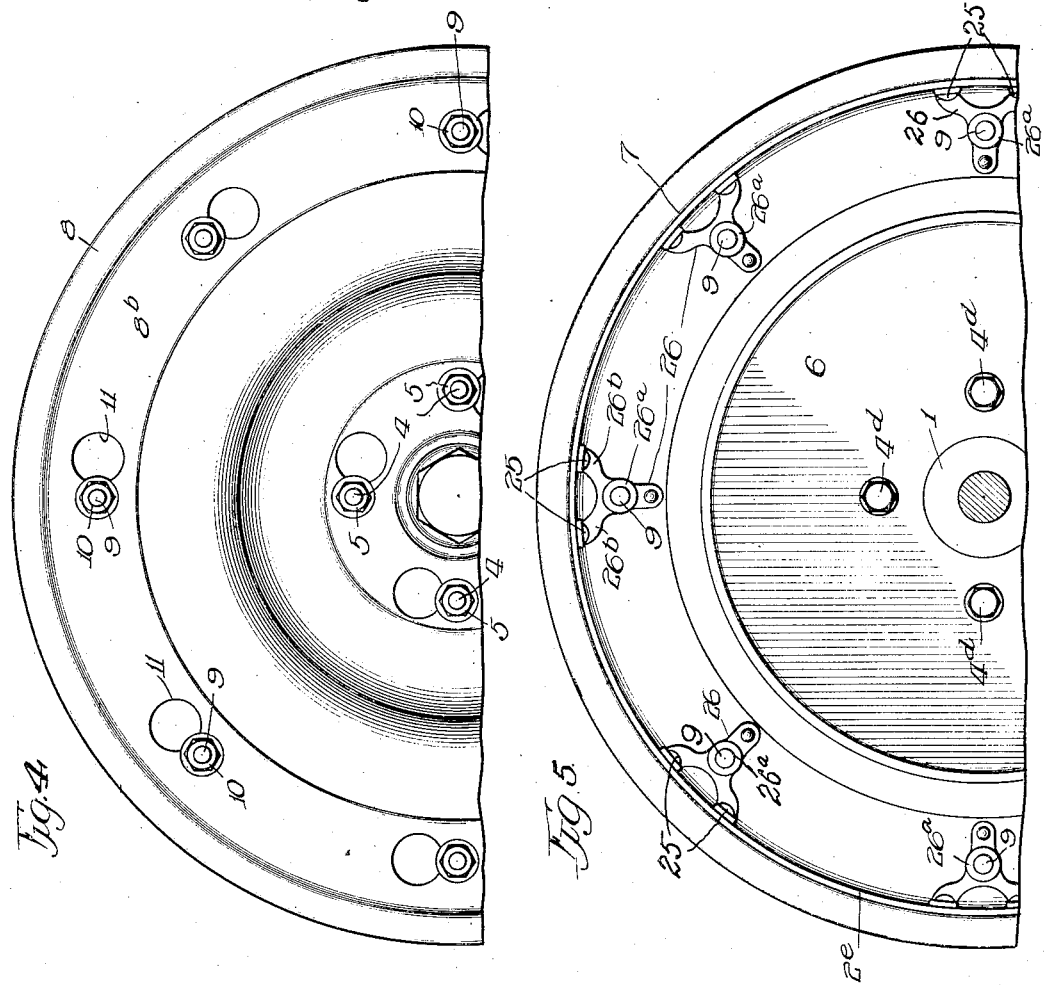
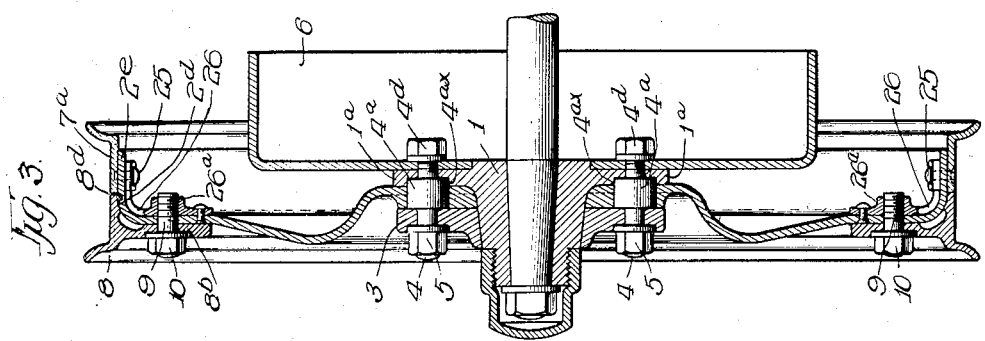
Witness:
P. Burkhardt
Inventor:
M Volney Liddell, Dec. 7, 1926.
M. V. LIDDELL
1,609,878
DISK WHEEL
Original Filed April 22, 1920  3 Sheets-Sheet 3
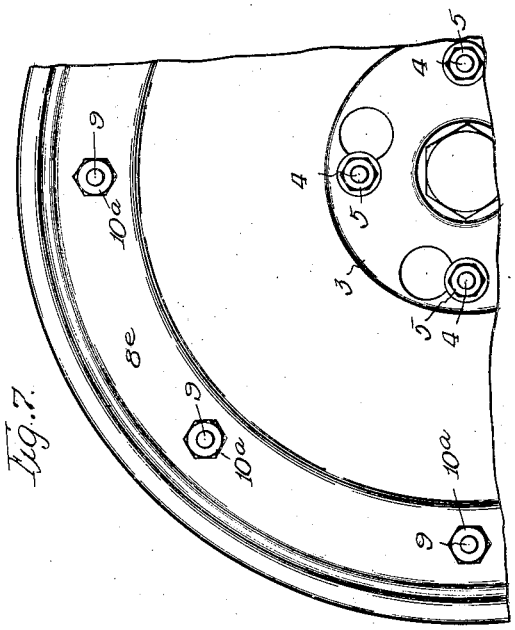
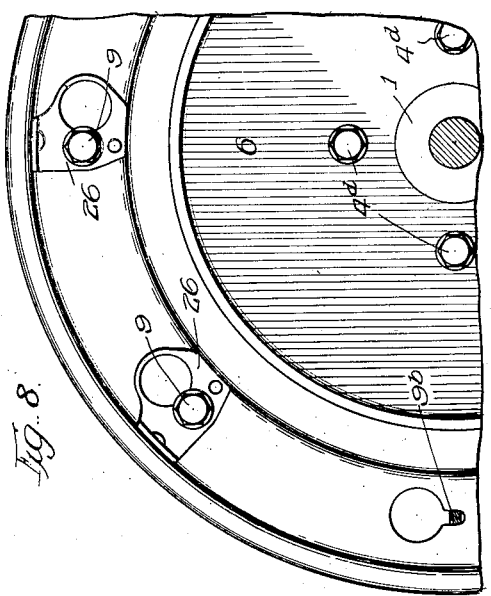
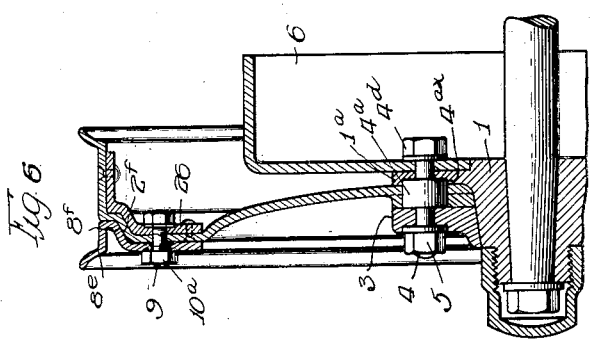
Witness:
R. Burkhardt.
Inventor:
M. Volney Liddell,
By Stetson Hughey Byron Knight
attys.

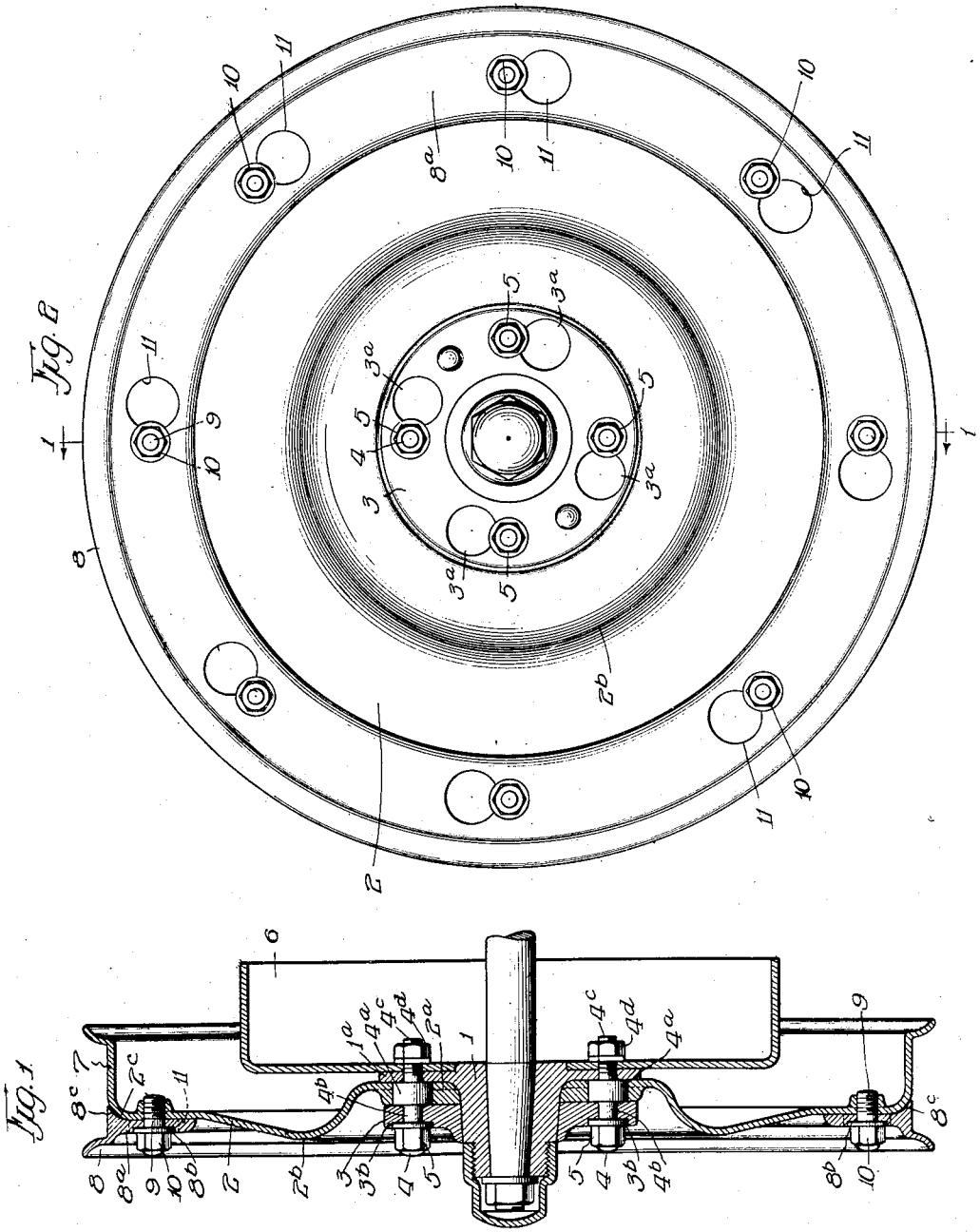

Patented Dec. 7, 1926.

1,609,878

UNITED STATES PATENT OFFICE.

MOSES VOLNEY LIDDELL, OF MATTITUCK, NEW YORK.

DISK WHEEL.

Application filed April 22, 1920, Serial No. 375,762. Renewed May 3, 1926.

This invention relates to a wheel in which the portion of the structure which transmits the load from the rim to the hub is in the form of a disk or web, and particularly to that type of such wheels in which the rim is constructed with flanges for confining a tire thereon and one of said flanges is readily separable from the rim for the purpose of changing an inflated for a deflated pneumatic tire.

One object of the invention is to provide the readily removable but safely attached flange member for confining the tire upon the rim, to which end another feature of the invention consists in separately forming one of the flanges of the rim and associating it with the wheel through means of an annular attaching ring bolted to the web adjacent the rim, but having its bolts received in keyhole slots so that it may be readily unlocked by partial rotation of the removable flange relatively to the wheel; additional features incident to this part of the invention consisting in providing a tapered seating between the removable flange and the wheel which insures accurate centering of the flange upon the wheel, and having one or more of the securing means countersunk through means of a spot-faced seat in the member which carries the keyhole slots so as to resist relative rotation between the wheel and the removable flange until such securing means is loosened. Another feature of the invention consists in applying between the permanently assembled portion of the flanged rim and the web, brackets which reinforce said rim portion in the direction of loading and at the same time provide increased thickness of metal at those points in the web at which the bolts are inserted which secure the detachable flange in place.

In the accompanying drawings—

Figures 1 and 2 represent in axial section and in face view one embodiment of the several features of the invention.

Figures 3, 4, and 5 are, respectively, a diametric section and two opposite face views of a modification, according to which the removable peripheral flange is made out of a stamped plate.

Figures 6, 7, and 8 are, respectively, a diametric section and two opposite face views of a further modification, according to which a keyhole slot is formed in the web member and in its reinforcing bracket instead of in the removable flange member.

Referring to Figures 1 and 2, 1 represents a hub having a radial flange $1^a$; 2 represents a disk of the wheel provided with an attaching base $2^a$ adapted to overlap the flange in the direction of the axis of the wheel; 3 represents an annular clamping plate adapted to overlie the attaching base $2^a$; and 4 represents securing means, preferably in the form of bolts, which extend outwardly through the plate 3 and receive nuts 5 that press the plate firmly against the attaching base of the web. To resist relative rotation between the web and the hub, the base $2^a$ fits upon the studs $4^a$, which are preferably parts of the same bolts 4 which secure the plate 3, and in order that these same bolts may be used for the still further purpose of securing the brake drum 6 on the inner side of the wheel, said bolts are constructed with inner ends $4^c$ that extend through the drum 6 and receive the nuts $4^d$. Studs $4^a$ that receive the base $2^a$ of the web 2 are enlarged over the main diameter of bolts 4, $4^c$, for the purpose of providing heads to oppose the nuts $4^d$ and also to permit the openings in the base $2^a$ to seat snugly thereon when made sufficiently large to pass over the nuts 5 in assembling and disassembling the web with the hub.

Bolts 4 receive the reduced portion of keyhole slots $3^a$ upon their shanks $4^b$, and the nuts 5 are received in the spot-faced seats $3^b$ in the clamping plate 3 which communicate with the larger portions of the slots $3^a$ through openings too small to pass the nut 5, so that as long as the nut 5 is firmly seated it constitutes a safe lock against rotation of plate 3 to releasing position relatively to the nuts 5. When, however, nuts 5 have been backed off sufficiently to take them out of their countersinks or seats $3^b$ and rotation of plate 3 has been effected, the plate can be readily lifted off over the nuts, so that the nuts never have to be wholly removed from the bolts in practice. When designed to the best advantage the thickness of the web base $2^a$ will be such that the openings through which it receives the studs $4^a$ will pass on to the nuts 5 before they leave the studs $4^a$, and vice versa. In this way passing the web on or off the hub is facilitated.

The principle of having one member of the wheel releasable from another member thereof by partially backing off the securing means and developing relative rotation between the parts, may also be applied to the rim of a wheel that is required to be removable for the purpose of applying and removing a tire. Thus, the rim 8 has a radially disposed attaching ring 8ª secured by bolts 9 with heads 10, and having keyhole slots 11 through which it receives the bolts and one or more spot faced seats 8ᵇ for one or more of the heads 10. With this means of securing the removable flange to the wheel the procedure of replacing a tire may be carried out very rapidly and very conveniently. In both arrangements the quickness and convenience are contributed to by the fact that the bolts need never be wholly removed.

In addition to the readily releasable securing means, the rim flange 8 is centered upon the wheel by means of the tapered seat 8ᶜ on the former meeting the tapered seat 2ᶜ on the latter.

The construction shown in Figures 3, 4, and 5 correspond substantially in principle to that disclosed in Figures 1 and 2, but the rim 7ª is made separate from the web of the wheel, and the latter is provided with a horizontally extending portion 2ᵉ which serves as a felly to receive the rim member 7ª and to which said rim member is secured by means of rivets 25. Moreover, the felly 2ᵉ is so designed as to provide a seat 2ᵈ that largely takes up the vertical load on the removable rim member 8 and thus greatly relieves the bolts 9 of shearing strains. In order to get proper bearing for the threaded ends of the bolts 9, brackets 26 are applied to the inner side of the rim structure and are so designed that each bracket provides a boss 26ª to receive the threaded end of bolt 9 and arms 26ᵇ that assist in sustaining the felly 2ᵉ and receive the rivets 25.

According to Figures 6 to 8, the flange member 8ᵉ has its seat 8ᶠ, to sustain radial load, formed by deflecting the metal of the attaching flange inward to meet a corresponding seat 2ᶠ pressed into the web member 2. By this construction the removable flange may be made of stock metal plate of uniform thickness. A further feature disclosed in Figures 6 to 8 is that of having the keyhole slots 11ª, which permit the studs 9 to interlock by relative circumferential movement, formed in the web of the wheel and the bracket 26 which it carries on its inner face, so that the studs may remain permanently attached to the removable flange 8ᵉ and the slots will be out of sight. In this arrangement, axial movement of the studs necessary to sink them into the spot seats 11ᵇ around the narrow ends of the slots is developed by making the heads on the outer ends in the form of adjustable nuts 10ª, and to facilitate this the shanks 9ᵇ of the studs, through which they enter the keyhole slots in the web, are flattened, faced, or otherwise rendered non-rotatable therein.

In all of the forms of the invention, the web member carries a laterally extending tread portion either in the form of a rim member (Figures 1 and 3) or in the form of a felly (Figure 6), and this tread portion is on the same side of the web as the hub flange. This brings the web well outward in the best position to receive shocks resulting from combined radial load and lateral thrust, as, for instance, in striking an unevenness in road surface or obstruction while following a curved course.

One advantage in applying the fixed rim member as well as the removable rim member in the form of a separate piece is that these parts can be rolled to shape.

In all the forms, the fixed and removable rim members are to be considered as typical of the peripheral structure of the wheel so that while illustrated in form for directly confining a tire upon the wheel, they might obviously, with slight modification, be adapted for confining a demountable rim.

I claim:

1. In a wheel, a web member, a tread member on said web member, and a removable flange member bearing on said tread member both radially inward and in the direction of the axis of the wheel, and having an ataching ring overlapping the web member; said flange member and tread member meeting through tapered seats that center the one upon the other; said web member carrying attaching studs; and said removable flange member having key hole slots receiving said studs and by circumferential movement interlocking with and unlocking from the studs.

2. In a wheel, a web member having at its periphery an extension providing a tread member, and reinforcing brackets secured to the web member and to said tread member to resist radial stresses upon said tread member; said wheel having a rim member supported upon said tread member, and securing means passing through the rim member, tread member, and the bracket.

Signed at Akron, Ohio, this 15th day of April, 1920.

MOSES VOLNEY LIDDELL.